United States Patent [19]

Bird et al.

[11] Patent Number: 4,557,149
[45] Date of Patent: Dec. 10, 1985

[54] PORTABLE 90 DEGREE PROOF LOADING DEVICE

[75] Inventors: Richard G. Bird, Torrance; Leo A. Berson, Pico Rivera, both of Calif.

[73] Assignee: The United States of America as represented by the Administrator of the National Aeronautics & Space Administration, Washington, D.C.

[21] Appl. No.: 491,113

[22] Filed: May 3, 1983

[51] Int. Cl.$^4$ ................................................. G01L 5/00
[52] U.S. Cl. .................................. 73/862.54; 73/862.01
[58] Field of Search ................ 73/761, 862.01, 862.23, 73/862.49, 862.54, 862.58, 825

[56] References Cited

U.S. PATENT DOCUMENTS

| | | | |
|---|---|---|---|
| 3,485,092 | 12/1969 | Benner | 73/862.53 |
| 3,563,087 | 2/1971 | Brunelle et al. | 73/761 |
| 3,693,418 | 9/1972 | Kaspareck | 73/862.01 |
| 4,030,353 | 6/1977 | Shutt | 73/862.23 |

*Primary Examiner*—David L. Lacey

*Attorney, Agent, or Firm*—Russell E. Schlorff; John R. Manning; Marvin F. Matthews

[57] ABSTRACT

A hydraulically actuated device for applying a test load to a bearing or the like to prove the integrity of its mounting or staking within a bore in a housing such as a gear case or the like. To accommodate limited access situations the device is constructed in a right angle configuration in which a hydraulic cylinder 21 applies axial pressure to a first thrust rod assembly which includes first thrust rod 18 through threaded spindle 22 driving a linearly translated cam 32 engaging a cam follower wheel 36 to transfer the translation to a second thrust rod assembly which includes a horizontal shaft 38 and spindle 45 within a cross-arm housing portion 11 and a tubular housing portion 17. The same second thrust direction applies the bearing loading in either of two directions depending upon the shape of the interface parts comprising interface part 57, washer 58, and interface part 60 at the extremities of the spindle 45 and its tubular housing portion 17. The interface parts can bear on the bearing under test from either side thereof with respect to the bearing mounting structural part 51.

14 Claims, 5 Drawing Figures

PORTABLE 90 DEGREE PROOF LOADING DEVICE

ORIGIN OF THE INVENTION

The invention described herein was made in the performance of work under a NASA contract and is subject to the provisions of Section 305 of the National Aeronautics and Space Act of 1958, Public Law 85-568 (72) Stat. 435; 42 U.S.C. 2457).

DESCRIPTION

1. Technical Field

The invention relates generally to localized test load application, and more specifically to apparatus for bidirectional force application to a bearing or the like with respect to its mounting or staking in a bore through a housing or bulkhead, particularly in limited access situations.

2. Background Art

Wherever a bearing or similar part is installed into a bore or opening in a housing or bulkhead, the question arises as to the thrust resistance of this installation. In most mass produced assemblies, such as automotive vehicles, for example, design criteria are relied upon to ensure the integrity of the installation and individual proof loading is not employed. Such reliance is justified where failures or degradations in bearing performance only result in the need for repair or replacement.

In some situations, an extremely high degree of operational reliability is necessary, such as in aircraft or space vehicles. In those instances, degradation or outright failure of a bearing or its mounting can have serious consequences. In spacecraft especially, the individual proof loading of some bearings is essential. Also, this proof loading often must be accomplished as near to a final assembly situation as possible. Accordingly, tight access situations are likely to be encountered such that a test device which is substantially elongated cannot clear obstructions or be fitted into limited recesses adjacent to bearings to be proved.

It is therefore a requirement that a proof loading device of the type to which the invention applies be as small as possible, as short overall in the direction of load force application, and that load cells, hydraulic cylinder drive, etc., be as removed from the immediate vicinity of the bearing to be proofed as possible.

In the prior art, the application of proof testing forces to fasteners is described in U.S. Pat. No. 3,563,087 (L. J. Brunelle et al.). In that reference a hydraulically induced (pulling only) force, measured by a conventional fluid pressure gauge, is applied. The Brunelle apparatus is not for bidirectional test force application and therefore is not adapted to such applications as testing of the integrity of bearing staking, the latter being a prime function of the present invention. The force application measurement technique in Brunelle is not sufficiently accurate for critical bearing staking proof testing since the static friction of the hydraulic piston used will subtract from the force indicated by the gauge. Moreover, the repeatability of the actual force applied is likely to be inadequate because of this same static piston friction characteristic.

A device described by Shutt in U.S. Pat. No. 4,030,353 gives the superficial impression of a right angle device possibly adapted to provide applicant's functions, however upon closer analysis proves to be a cable winch arrangement such as might be used in helicopter rescue operations, Shutt's actual teachings relate to limiting the torque or force applied to position the boom of the device. Thus the Shutt apparatus does not relate to the same art as the present invention.

In U.S. Pat. No. 3,693,418 (Kaspareck), a purely mechanical force applicator is suggestive of the familiar hand operated center punch. In Kaspareck, the force applied (compression only) is a function of mechanical parameters, principally the spring constant of a compression spring. Variable internal static friction would inherently cause variation of the force applied before reset and no independent force measuring structure is provided. Apparatus of the Kaspareck type would not be suitable for the aircraft and spacecraft bearing staking proof loading application contemplated for the present invention.

U.S. Pat. No. 3,485,092 (Benner) shows a force control arrangement adapted for a motor and lead-screw driver table apparatus such as in a lathe or other similar power tool. The Benner invention appears to limit the force applied to an advancing tool, held by a moving chuck for example. Such apparatus as shown by Benner is clearly not adapted to the purpose of the present invention.

The manner in which the invention solves the problem of proof loading of installed bearings and the like by applying a unique 90° thrust conversion principle along with a unique structual arrangement for insuring the measured repeatability of the applied force will be evident as this description proceeds.

DISCLOSURE OF THE INVENTION

The invention comprises portable tester apparatus which can be hand held. The tester comprises a rigid, tee-shaped, generally tubular housing in which a first thrust rod is mounted with minimum static frictional resistance, in the column of the tee-shaped housing assembly for transmission of a pulling force generated by a hydraulic cylinder and measured by a conventional loade cell. The first thrust rod is essentially a pull rod and its force is transferred to a second thrust rod (horizontal shaft) in the cross-arm housing portion. This second thrust rod, like the first rod, is mounted in minimum friction bearings or ball bushings.

The pulling force exerted by the first rod is generated by a hydraulic cylinder and measured by a load cell, preferably of the strain guage type. An actuator plate (cam) is attached to the first thrust rod adjacent to the intersection of the column and cross-arm portions of the housing. The cam has a sloping ramp exerting a compressive force on a cam follower wheel attached to the second thrust rod (horizontal shaft) which results in a 90° axial force (with respect to the axis of the first thrust rod) being transmitted to the second rod.

At an end of the cross-arm housing portion, the second thrust rod projects from the housing and alternative load inserts (interface parts) provide for application of the proof load to the bearing or bushing in either direction with respect to the bulkhead in which the said bearing or bushing is installed (staked). Thus, a pinching force between the end of the aforementioned cross-arm housing portion can stress the bearing installation in either direction.

The 90° configuration of the apparatus of the invention is such that the hydraulic cylinder and load cell are removed from the structure associated with the second thrust rod and cross-arm housing portion, thereby facilitating closer quarter use of the test (proof load) apparatus than possible if those elements were aligned axially in an elongated configuration.

The details of a typical embodiment which appears, at this time, to comprise the best mode of implementation for the invention, are hereinafter set forth.

BRIEF DESCRIPTION OF THE DRAWINGS

The details of the invention will be described in connection with accompanying drawings in which.

BEST MODE FOR CARRYING OUT THE INVENTION

Figure 1:
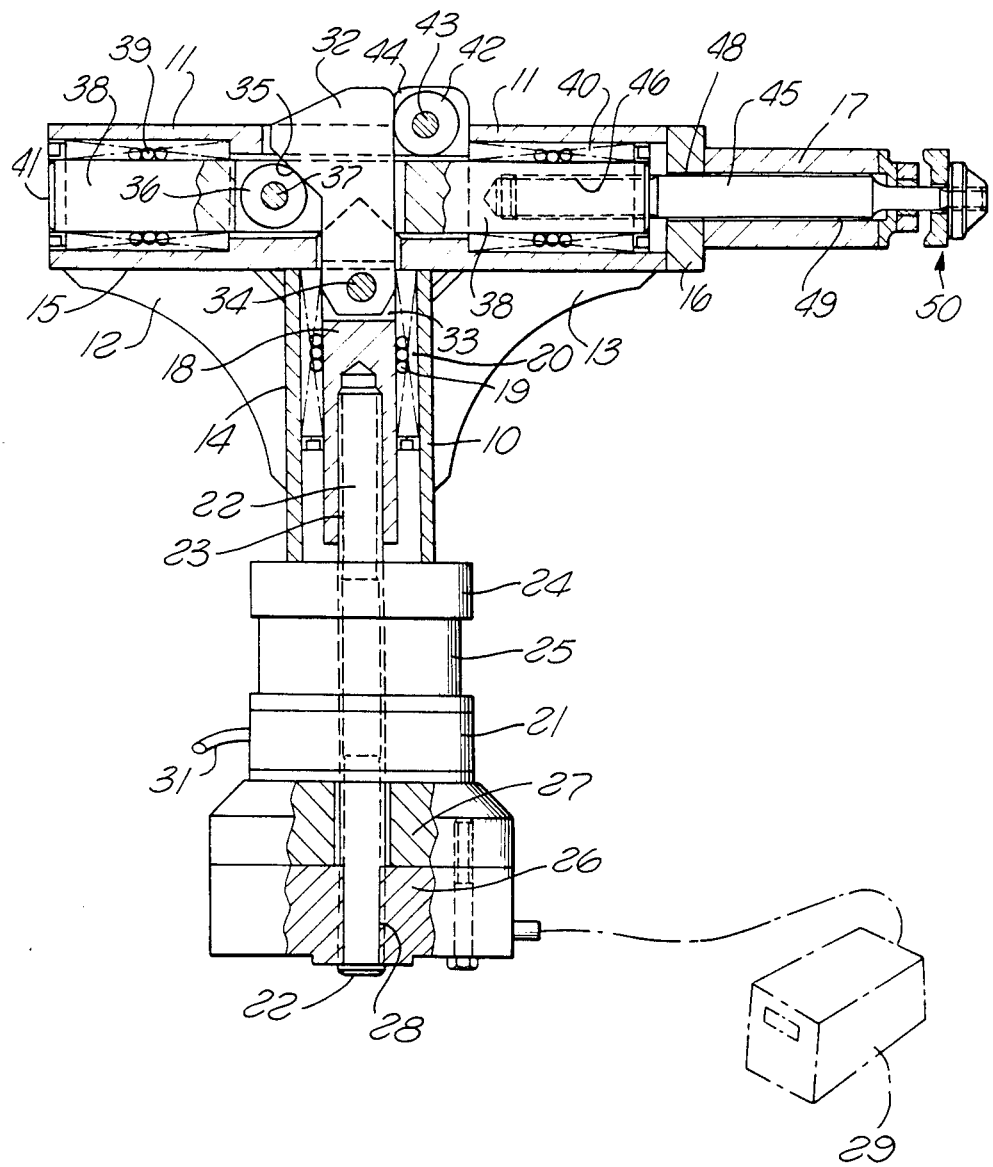
FIG. 1 is a partially axially sectioned view of an assembly of the apparatus of the invention.

Referring now to FIG. 1, the arrangement of the parts of the Proof Loading Device will be seen. The generally tubular tee-shaped housing has a column housing portion 10 and a cross-arm housing portion 11. These housing portions 10 and 11 are rigidly joined and braced by gussest 12 and 13, as by a welding operation at lines of contact such as 14 and 15, typically.

To the right end of tubular housing portion 11 (as pictured in FIG. 1), a disk-shaped piece 16 is fixed and a further tubular housing portion 17 is fixed to and extends from the disk-shaped piece 16 as illustrated.

A first thrust rod (internal shaft) 18 is contained within the housing column portion 10 and is free to translate axially with minimal friction within a support bearing 19. The support bearing 19 is normally of the type having a plurality of bearing balls extending both circumferentially and axially (ball bushing), and provides the desired support with minimum frictional resistance to axial movement of the first thrust rod 18. The support bearing 19 has an outer race 20, which is firmly fitted into the internal bore of the column housing portion 10. Acutally, in operation, the first thrust rod 18 is pulled downward by a hydraulic cylinder 21, but very little movement is actually caused, the transmission of the proof loading force being substantially a static situation. Movement of the first thrust rod 18 will later be seen to be indicative of failure of the bearing being proof loaded or "give" in the staking thereof. Accordingly, minimal static friction is most important, as will be understood more clearly hereinafter.

The downward thrust of the first thrust rod 18 is transmitted through a threaded spindle 22 which engages internal threads in an axial bore 33 within the first thrust rod 18. Similarly, the threaded spindle 22 is continuous through central clearance bores in spacers 24 and 25 and firmly into the base 26 of a load cell 27 via the threaded engagement 28. The threaded base 26 is bolted as shown and thus acts as an anvil placing the active portion of load cell 27 under compression (in operation) between housing portion 10 and this load cell threaded base 26. The aforementioned load cell 27 is an electrically responsive transducer of the strain gauge type, and is a commercially available part (catalog No. 500, obtainable from Interface, Inc., 7401 Butherns, Scottsdale, Ariz.).

The magnitude of the compressive force exerted against load cell 27 is measured by an instrument 29 (measuring load cell resistance, for example). A suitable instrument, properly scaled to read a force in kilograms or pounds directly on a digital read-out may include Digital Read-Out #7500 coupled with a Transducer Switching Unit TSU-5, both as manufactured by Interface, Inc., 7401 Butherns, Socttsdale, Ariz.

Of course, other well-known instrumentation could be substituted once it is understood that the compressive force extant between the lower end of threaded spindle 22 and the lower end of the column housing portion 10 is that which is to be measured.

The hydraulic cylinder 21 having a fluid port 31 responds by expanding axially (along a vertical line in FIG. 1) in response to hydraulic fluid under pressure introduced externally via port 31, and this will be seen to produce the downward thrust of the threaded spindle and compression loading of the load cell 27. The hydraulic cylinder 21 is in fact a hydraulic jack, available under part No. RWH-120 from Ereopac, Inc., division of Applied power, Inc., Butler, Wis.

A cam 32 will be seen to be pinned to a flat 33 in the first thrust rod 18 (actually the flat 33 being one surface produced by bifurcation of rod 18), by pin 34 which is pressed into a lateral bore formed in the first thrust rod 18. In operation, cam 32 is urged in a downward direction (as viewed on FIG. 1) so that its cam surface 35 exerts a force, which resolves into a downward component and a leftward component on a cam follower wheel 36.

Cam follower wheel 36 is preferably a standard ball bearing with its inner race press fitted onto a pin 37 which is firmly attached to a horizontal (second thrust) shaft 38. It will be seen more clearly from FIG. 2 that the cam follower wheel 36 is actually within slot 53. Accordingly, minimal frictional resistance to rotation of cam follower wheel 36 is encountered.

A pair of bearings 39 and 40, identified by the manufacturer as Ball Bushings—Super 16, (of the same type as the support bearing 19) effectively restricts any but axially sliding motion of horizontal shaft 38, that motion being resisted only by minimal friction in bearings 39 and 40. These bearings, as well as support bearing 19, are available from Thompson Industries, Inc., Manhasset, N.Y. The bearings 39 and 40 are firmly fitted (outer races press-fitted into the inside bore of the tubular cross-arm housing portion 11).

The mounting of cam 32 on pin 34 need not completely restrict the cam 32 from rotational freedom of itself (about pin 34), since a second roller or wheel 42 (likewise preferably itself a ball bearing such as, NR-1606 from Boston Gear, Quincy, Mass.) has its inner race pressed onto a pin 43. Pin 43 is in turn firmly attached to boss 44, which is in turn a part of or firmly mounted on the outside surface of cross-arm housing portion 11. Actually, pin 43 is supported between boss 44 and boss 54 as will be seen from FIG. 2.

From the foregoing, it will be realized that, in operation, cam 32 is restricted from any but downward motion (as viewed on FIG. 1), this downward motion or thrust being effectively and exclusively translated to a leftward thrust applied to horizontal shaft 38 with minimum static friction. Horizontal shaft 38 is free to project from the open end 41 of cross-arm housing portion 11.

It could be said that the cam follower wheel 36 and the second wheel 42 prevent lateral play of cam 32, keeping the cam surface 35 always in contact with cam follower wheel 36 during operation. Moreover, it should be noted that cam 32 clears the surfaces of slot 53 and touches only wheels 36 and 42 during operation.

Spindle 45 attaches to horizontal shaft 38, as an extension thereof, by means of a threaded engagement 46 within an axial bore in horizontal shaft 38 as illustrated.

The support provided by bearings 39 and 40 is such that only minimum clearance of spindle 45 such as shown by 48 and 49 is necessary.

It will be realized at this point that the horizontal shaft 38 and its extension spindle 45 can only be caused to exert a compression force, between the end cap assembly 50 and the tubular housing portion 17. The interface structure which applies the test or proof loading to a bearing or other part under test will be described subsequently in connection with FIG. 3a and 3b.

It may occur to the reader that measurement of hydraulic pressure at fluid port 31 would also provide an indication of the applied pressure between end cap assembly 50 and the end of cross-arm housing portion 11. While it is true that such a measurement, properly scaled, would indicate the applied pressure, the nature of hydraulic cylinders with their required tight sliding seals, is such that the repeatability of the net force as a function of hydraulic pressure is not sufficient for applications in which a proof load specification may set a repeatability tolerance of a relatively few pounds in a total force of several thousands of pounds.

Figure 2:
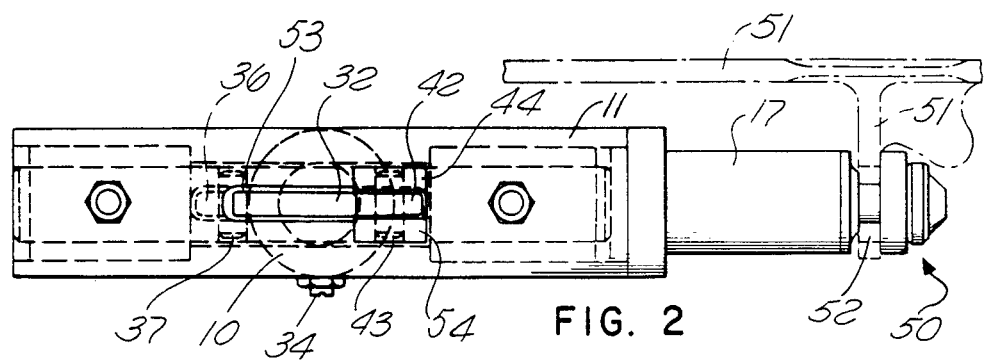
FIG. 2 is a top view of FIG. 1 also showing the application of the invention in a limited access situation.

Referring now to FIG. 2, a top view of the apparatus of the invention shows a typical restricted access situation.

From FIGS. 1 and 2, it will be noted that the cam 32 can be allowed to project through the top of cross-arm housing portion 11. A structural part of an aircraft, spacecraft, etc., is represented at 51. The structural part 51 actually contains a bore into which a bearing 52 has been fitted.

It will be noted from FIG. 2 that the horizontal shaft 38 (as well as cross-arm housing portion 11) has a slot 53 through which the cam 32 can project. The axial length of this slot in horizontal shaft 38 is defined by dashed lines on FIG. 1, but will be seen to be shorter through the wall of cross-arm housing portion 11. The axial length of slot 53 in the cross-arm housing portion 11 is sufficient to accommodate the full dimension of the cam 32 in the axial direction of horizontal shaft 38. The support for the second roller or wheel 42 and its pin 43 will be seen to be provided between the bosses 44 and 54, both affixed to the outside surface of the cross-arm housing portion 11. The pin 37, which is anchored within horizonatl shaft 38 is also seen in FIG. 2, as is cam follower wheel 36.

Figure 3A:
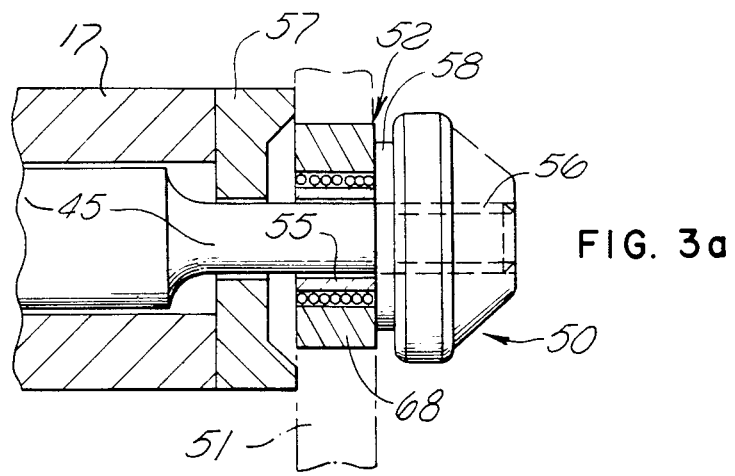
FIGS. 3a and 3b show detailed interface parts and their relationship to the bearing or bushing to be subjected to proof loading, for the two alternative directins of proof load as indicated.

Referring now to FIG. 3a, the outer race of the installed bearing (to be proof loaded is represented at 68 while the inner race is depicted at 55. In this case the bearing outer race 68 may be simple press-fitted into a bore in structural part 51, or it may be staked therein in the manner displayed in somewhat exaggerated form in FIG. 3b. A spindle 45 (necked down at its outer end) is an extension of horizontal shaft 38 and passes with clearance through the inner race 55 of the test bearing and a threaded end thereof engages threads in the cap 50 at 56.

An interface part 57 of the general shape as depicted in FIG. 3a serves to abut the structural part 51 without contacting the bearing. Spindle 45 passes through the center bore of the interface part 57 with clearance as was the case with the bearing inner race 55. A washer 58 serves to provide the appropriate surface interface between the bearing 52 and end cap assembly 50. However, it will be realized that the surface of the end cap assembly 50 itself could make washer 58 unnecessary if the relative bearing and cap diameters were appropriate, i.e., if the outer bearing race 68 in FIG. 3a has a diameter relatively larger than that of end cap assembly 50.

It will be understood from the description of FIG. 3a that the compression force between part 57 and the end cap assembly 50 exerts a net force on the bearing races 68 and 55 tending to push it to the left as viewed on FIG. 3a. If the installation of that bearing is not adequate to resist a prescribed test or proof force so applied, the applied force will be seen to decrease as indicated by instrument 29 (FIG. 1) corresponding to a yielding of the position of the bearing for a given steady applied force.

Figure 3B:
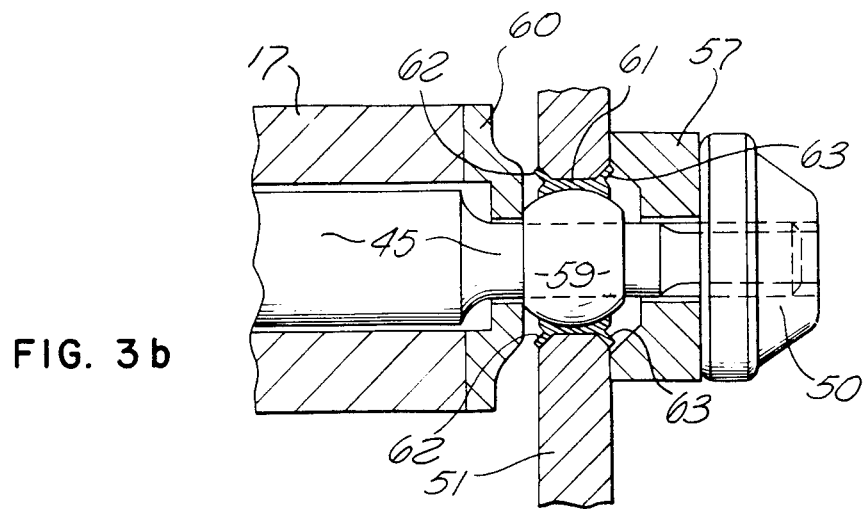

Referring now to FIG. 3b, a different type of bearing, namely the single truncated ball 59 with or without bearing balls in shown. In this example, the abutting interface part 57 has been moved to the position shown against the end cap assembly 50. Another interface part 60 designed with a central abutting surface has been placed against the end of tubular housing portion 17. Thus, the same compressive force developed between end cap assembly 50 and tubular housing portion 17 now applies the test force in the opposite direction as compared to FIG. 3a, namely to the right of FIG. 3b. Also, the configuration of FIG. 3b will be seen to test the integrity of ball 59 within the staked race 61 as well as the staking of race 61 to structural part 51. Thus, the race 61 is staked by rolled projections 62 and 63 over the chamfered surfaces of the bore in structural part 51 into which the bearing assembly is staked. It will be understood that the staking shown is somewhat exaggerated for clarity of description.

It will be clear from the foregoing description that various modifications to the specific structure are possible for the accommodation of bearings of various sizes and types, or for press-fit or staked bushings or the like.

Figure 4:
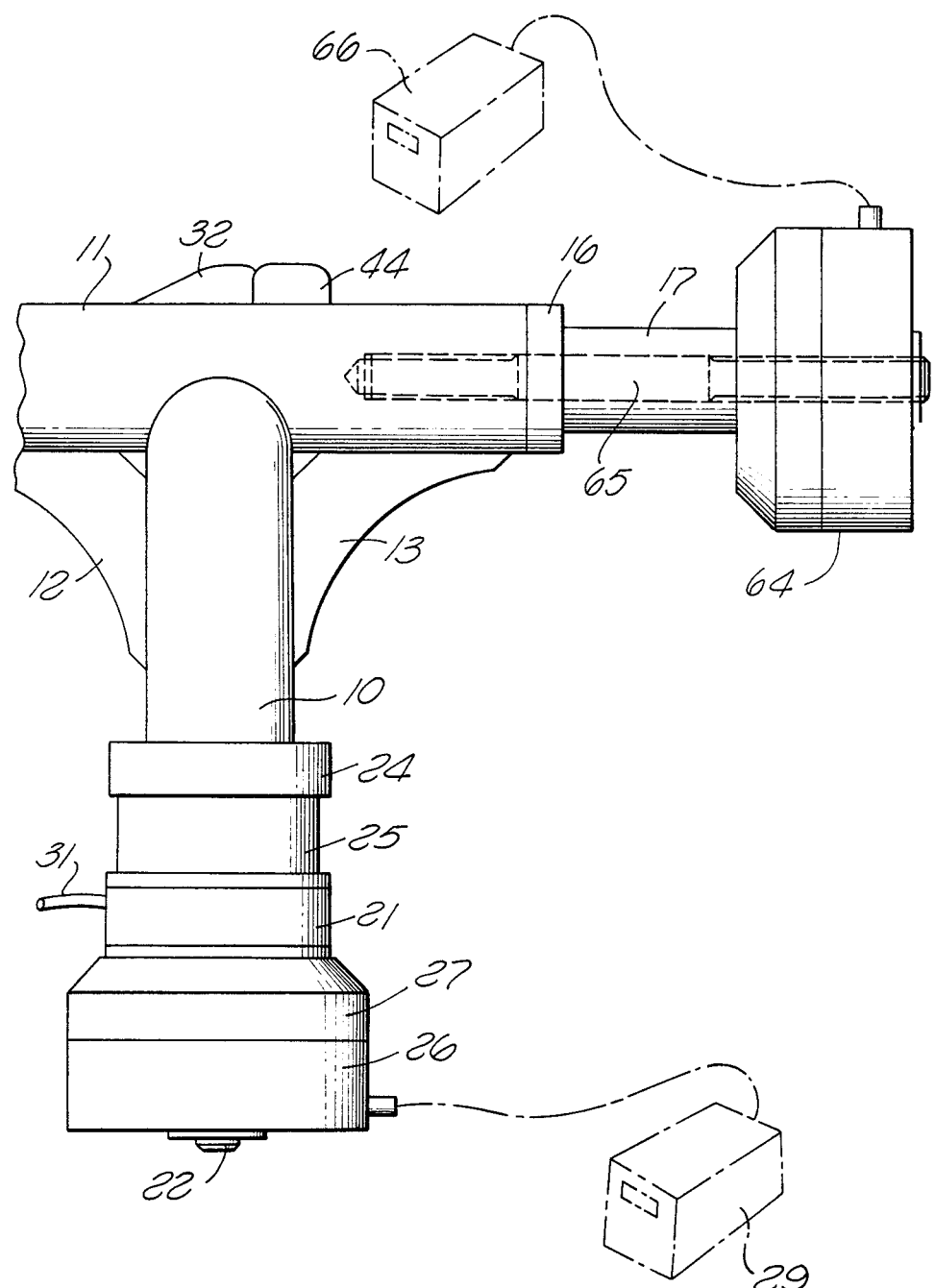
FIG. 4 shows the arrangement of apparatus for calibration and proving of the repeatability of output force versus input force in the device.

Referring now to FIG. 4, an unsectioned equivalent to FIG. 1 is presented, primarily to show the force calibration technique used to prove the repeatability and low static friction of the overall device. For that purpose, an additional load cell 64, (as nearly identical to load cell 27 as possible) is placed at the end of and abutting tubular housing portion 17 in lieu of the interface parts illustrated in FIG. 3a and 3b. A temporary threaded shaft 65 engages the horizontal shaft 38 (within cross-arm housing portion 11) at threaded engagement 46 in FIG. The threaded shaft 65 also has a second threaded end to engage the base of load cell 64 comparable to the threaded engagement 28 in base 26 of FIG. 1. In this way, a second read-out on instrument 66 is available and, over a predetermined range of applied forces by hydraulic cylinder 21, must read the same as instrument 29 within a prescribed tolerance. A larger than specified discrepancy between the readings of instruments 29 and 66 during calibration is indicative of excessive static friction within the device.

FIG. 4 also identifies various parts which are the same as described in FIG. 1 as will be obvious to the reader.

The arrangement of FIG. 4 is used only to confirm that the internal friction of the device is relatively low and therefore the readings of displays are normally close and are repeatable, not as an operational arrangement.

Various modifications and variations will suggest themselves to those of skill in this art, for example, in some cases it may be disirable to avoid loading the inner race of a bearing such as the inner race 55 (FIG. 3a, and accordingly, washer 58 can be counterbored or recessed on its surface facing inner bearing race 55. In the opposite loading sense, the interface surface of interface part 60, as in FIG. 3b, can be similarly counterbored or recessed such that it contacts only the staked race 61.

Bearings are sometimes bonded to the bore in which they are fitted (for example, outer race 68 may be bonded to the bore in structural part 51 in FIG. 3a), and the proof loading then tests the integrity of this bond.

Other modifications within the spirit of the invention will occur to the skilled reader once the concepts of the invention are understood. For still another example, accurately machined sleeve bearings could be substituted for bearings 19, 39 and 40, the main criterion for those bearings being very low friction.

Suitable materials are readily selected through exercise of ordinary design skill.

We claim:

1. A device for proof loading of bearings and the like, comprising: a generally tee-shaped tubular housing having column and cross-arm portions, externally firmly attached to each other; a first thrust rod within said housing column portion and low friction support means associated therewith, said first thrust rod and low friction support means being positioned and arranged so as to permit low frictional, longitudinal translation of said first rod; a second thrust rod within said housing cross-arm portion and low friction support means associated therewith, said second thrust rod and low friction support means being positioned and arranged so as to permit low frictional, longitudinal translation of said second rod, said second rod projecting from an end of said cross-arm housing portion; a cam attached to one end of said first thrust rod substantially at the junction of said column and cross-arm housing portions and a cam follower attached to said second thrust rod, said cam having an angled surface in contact with said cam follower such that a pulling force applied to a second end of said first rod produces a pulling force tending to draw said thrust rod into said cross-arm housing portion; fluid operated means for applying said pulling force to said first rod and load cell and display means for measuring and displaying the magnitude of said first rod pulling force; and a pair of interchangeable interface parts cooperating with said second thrust rod with one of said parts being mounted on the projecting end of said second thrust rod, one of which has a force application surface having a greater diameter than the diameter of the other part having a force application surface.

2. A device according to claim 1 in which the angle between said column and cross-arm housing portions and therefore between said first and second thrust rods is substantially a right angle.

3. A device according to claim 2 in which said first and second thrust rod low friction support means comprise, respectively, a first thrust bearing within said column housing portion and second and third thrust bearings within said cross-arm housing portion, one of said second and third thrust bearings being placed on each side of said cam.

4. A device according to claim 3 in which said cam follower is a first roller rotatably mounted to said second thrust rod about a low friction bearing.

5. A device according to claim 4 in which a second roller is rotatably mounted to said cross-arm housing portion and bears upon a surface of said cam substantially opposite to said angled surface of said cam.

6. A device according to claim 5 in which said cam angled surface is substantially a 45° surface with respect to said first thrust rod.

7. A device according to claim 6 wherein said interface parts have a central bore and in which said portion of said second rod projecting from an end of said cross-arm housing portion outside of said cross-arm housing portion is a diameter to pass with clearance through said central bore of said interface parts except said outer interface part.

8. A device according to claim 2 in which said cam angled surface is substantailly a 45° surface with respect to said first thrust rod.

9. A device according to claim 1 in which said first and second thrust rod low firction support means comprise, respectively, a first thrust bearing within said column housing portion and second and third thrust bearings within said cross-arm housing portion, one of said second and third thrust bearings being placed on each said of said cam.

10. A device according to claim 1 in which said cam follower is a first roller rotatably mounted to said second thrust rod about a low friction bearing.

11. A device according to claim 10 further including a second roller rotatably mounted to said cross-arm housing portion and bearing upon a surface of said cam sustantially opposite to said angled surface of said cam.

12. A device according to claim 1 in which said fluid operated means for applying said first rod pulling force is a hydraulic cylinder.

13. A device according to claim 1 wherein said interface parts have a central bore and in which said portion of said second rod projecting from an end of said cross-arm housint portion outside of said cross-arm housing portion is of a diameter to pass with clearance through said central bore of said interface parts except said outer interface part.

14. A device according to claim 1 in which said cross-arm housing portion includes a slot aligned with said cam, and said cam projects through said slot at least partly outside said cross-arm housing portion to minimize the overall size of said cross-arm housing portion.

* * * * *